United States Patent
Nozaki

(10) Patent No.: US 8,156,765 B2
(45) Date of Patent: Apr. 17, 2012

(54) GLASS FORMING APPARATUS AND GLASS FORMING METHOD

(75) Inventor: Moriji Nozaki, Sagamihara (JP)

(73) Assignee: Ohara Inc., Kanagawa (JP)

( * ) Notice: Subject to any disclaimer, the term of this patent is extended or adjusted under 35 U.S.C. 154(b) by 539 days.

(21) Appl. No.: 11/783,214

(22) Filed: Apr. 6, 2007

(65) Prior Publication Data
US 2007/0234760 A1  Oct. 11, 2007

(30) Foreign Application Priority Data

Apr. 10, 2006 (JP) ................................. 2006-107961
Mar. 15, 2007 (JP) ................................. 2007-066462

(51) Int. Cl.
*C03B 11/12* (2006.01)
*C03B 11/00* (2006.01)

(52) U.S. Cl. .......................................... 65/319; 65/305

(58) Field of Classification Search ...................... 65/319
See application file for complete search history.

(56) References Cited

U.S. PATENT DOCUMENTS

| | | | | |
|---|---|---|---|---|
| 2,882,647 | A * | 4/1959 | Tallent | 65/319 |
| 4,032,317 | A * | 6/1977 | Carmi et al. | 65/161 |
| 5,188,652 | A * | 2/1993 | Nakamura et al. | 65/319 |
| 5,405,652 | A * | 4/1995 | Kashiwagi et al. | 427/282 |
| 5,711,780 | A | 1/1998 | Taniguchi | |
| 2002/0167795 | A1 * | 11/2002 | Capriz et al. | 361/690 |

FOREIGN PATENT DOCUMENTS

| | | |
|---|---|---|
| JP | 10-212127 | 11/1998 |
| JP | 2003-112927 A | 4/2003 |
| JP | 2005-67980 A | 3/2005 |

OTHER PUBLICATIONS

Zwick, J. W. Effect of Surface Flatness on Interface Heat Transfer. © 1988.*
Notice of Reasons for Rejection issued to Japanese Application No. 2007-066462, mailed Mar. 15, 2011.

* cited by examiner

*Primary Examiner* — Khanh P Nguyen
*Assistant Examiner* — Carson Gross
(74) *Attorney, Agent, or Firm* — Hoffmann & Baron, LLP

(57) ABSTRACT

A glass forming apparatus and a glass forming method of high economical merit and high production efficiency are provided. More specifically, the glass forming apparatus has dies, in which at least one die is divided into a heat exchange unit and a press unit, and in the glass forming apparatus and glass forming method, the plane precision is improved in the contact dividing surfaces of the heat exchange unit and the press unit.

A glass forming apparatus includes a die having a press surface for pressing a glass material, in which the die has a plurality of dies, and at least one die is divided into a heat exchange unit and a press unit. Preferably, the surface precision of at least one part of each dividing surface in contact with the heat exchange unit and the press unit has a flatness (PV) of 500 μm or less, and the plane precision of at least one part of the dividing surface has a surface roughness (Ra) of 100 μm or less.

13 Claims, 2 Drawing Sheets

GLASS FORMING APPARATUS AND GLASS FORMING METHOD

This application is based on and claims the benefit of priority from Japanese Patent Application No. 2006-107961, filed on 10 Apr. 2006, and Japanese Patent Application No. 2007-066462, filed on 15, Mar. 2007, the content of which is incorporated herein by reference.

BACKGROUND OF THE INVENTION

1. Field of the Invention

The present invention relates to a glass forming apparatus and a glass forming method, and more particularly to an apparatus and a method of forming a glass substrate or a crystallized glass substrate for an information storage medium disk.

2. Related Art

Optical devices such as lenses and glass substrates for information storage medium disks and the like are usually manufactured by pressing and forming a glass ingot (molten glass) by either a direct press method or reheat press method.

The direct press method is a method of pressing and forming a glass ingot by using a die (a molding die, including upper die and lower die as described below), by lowering the temperature of a specified weight of molten glass to a forming temperature range. The reheat press method is a method of pressing and forming a glass ingot by a die, by reheating a specified weight of glass ingot obtained by cooling and solidifying molten glass, and heating up to a forming temperature range.

By the press forming method, in a process of obtaining a glass formed piece, such as a glass substrate for a lens or information storage medium disk, by press forming by a die for forming the glass ingot, the forming die receives heat from the molten glass. The forming die receiving heat has its temperature raised, and when glass formed pieces are manufactured continuously, a device for cooling the forming die is needed. If glass formed pieces are manufactured without cooling the forming die, the glass formed pieces may stick to the forming die, and the surface precision of the glass formed pieces is lowered significantly, and desired glass formed pieces cannot be obtained. Therefore, a glass forming apparatus capable of cooling the forming die is provided (see, for example, Japanese Unexamined Patent Application Publication No. H10-212127).

The glass forming apparatus disclosed in Japanese Unexamined Patent Application Publication No. H10-212127 has a heat exchange chamber in an upper die, and in the heat exchange chamber, a heat exchange fluid (for example, air containing water particles) for absorbing the heat around the press surface and cooling the press surface is fluidized and circulated.

SUMMARY OF THE INVENTION

In a forming die as described above, a press surface is roughened in the course of repeating the pressing process, and it may be reused by regrinding the press surface. In a forming die in Japanese Patent Application Laid-Open No. H10-212127, since a heat exchange unit is formed integrally in the forming die, if the wall thickness is reduced after repeated regrinding, the forming die must be discarded together with the heat exchange unit, which has not been economical.

Besides, due to cumbersome replacement operations of the forming die, the manufacturing operation is suspended for long periods, and production efficiency has been poor.

The present invention is devised to solve these problems, and it is hence an object thereof to provide a glass forming apparatus and a glass forming method of high economical and production efficiency.

The inventor realized the invention by discovering that, in a glass forming apparatus including a plurality of dies having a press surface for pressing a glass material, by dividing at least one die into a heat exchange unit and a press unit, the heat exchange unit can be used repeatedly.

However, by dividing into the heat exchange unit and the press unit, another problem occurs in that heat conduction between the heat exchange unit and the press unit is not satisfactory.

This problem became clear when the inventor initially developed glass forming apparatus 500 shown in FIG. 3 and FIG. 4.

The glass forming apparatus 500 is composed of a press machine (pressing means) 510, and an lower die 530 and an upper die 520 fixed to the press machine (pressing means) 510, and the upper die 520 is divided into a heat exchange unit 521 fixed to the press machine (pressing means) 510, a press unit 523 abutting against molten glass Y having a fixing ring 524, and a spacer unit 522 for coupling the heat exchange unit 521 and press unit 523. A convex sidewall of the heat exchange unit 521 and concave sidewall of spacer unit 522 are threaded. The heat exchange unit 521 and spacer unit 522 are attached or detached by engaging the convex portion of the heat exchange unit 521 and the concave portion of spacer unit 522 by making contact between a dividing surface 521a of the heat exchange unit 521 and the concave surface 522a of the spacer unit 522. The press unit 523 is fixed by coupling the fixing ring 524 to the spacer unit 522 by a bolt or the like. If the surface precision of the press surface 523a of the press unit 523 is impaired due to wear or abrasion, the press unit 523 and the spacer unit 522 are replaced as a set.

Thus, by making the press unit 523 and the spacer unit 522 attachable and detachable by a screw engagement, they can be replaced quickly, and productivity is enhanced, but since the spacer unit 522 has a concave shape, the concave surface 522b can be machined and processed only by lathe machining, favorable surface precision is not obtained, and the contact precision is poor, which is found to be a cause of the above-mentioned poor heat conduction.

Further, since there are fluctuations in the contact precision of these divided portions, heat conduction is not uniform, the forming condition is not stable, pressure is not uniform in the members at the time of pressing, and it is likely to cause breakage.

In the glass forming apparatus, at least one die is divided into the heat exchange unit and the press unit, and it is desired to provide a glass forming apparatus and a glass forming method in which plane precision in the divided surface in contact with heat exchange unit and press unit is improved.

To solve this new problem, the inventor found, by forming preferably flat planes in the divided surface divided into the heat exchange unit and the press unit, and controlling the plane precision of the contact portions of the heat exchange unit and the press unit to a flatness (PV) of 500 μm or less, the glass forming condition (cooling or heating condition) is stabilized, being excellent in contact precision, and uniform in heat conduction (cooling or heating) on the entire plane. More specifically, the invention provides the following.

In a first aspect of the invention, a glass forming apparatus comprises a die having a press surface for pressing a glass material, in which the die has a plurality of dies, and at least one die is divided into a heat exchange unit and a press unit.

In a second aspect of the invention, in the glass forming apparatus according to the first aspect, the surface precision of at least one part of each dividing surface in contact with the heat exchange unit and the press unit has a flatness (PV) of 500 μm or less.

In a third aspect of the invention, in the glass forming apparatus according to the first or second aspects, the plane precision of at least one part of the dividing surface has a surface roughness (Ra) of 100 μm or less.

In a fourth aspect of the invention, in the glass forming apparatus according to the second or third aspects, the area of each dividing surface having the specified surface precision is 80% or more of the projected area of the formed piece on the dividing surface.

In a fifth aspect of the invention, in the glass forming apparatus according to any of the first to the fourth aspects, the dividing surface divided into the heat exchange unit and the press unit is a flat surface.

In a sixth aspect of the invention, in the glass forming apparatus according to any of the first to the fifth aspects, the die is detachably coupled to pressing means at the heat exchange unit.

In a seventh aspect of the invention, in the glass forming apparatus according to the sixth aspect, the die is detached from the pressing means and replaced in a state in which the heat exchange unit and the press unit are integrated.

In an eighth aspect of the invention, in the glass forming apparatus according to any one of the first to the seventh aspects, a heat exchange chamber is formed inside the heat exchange unit, and a heat exchange fluid for exchanging heat with the peripheral area is circulating inside the heat exchange chamber.

In a ninth aspect of the invention, in the glass forming apparatus according to the eighth aspect, a passage for circulating the heat exchange fluid is detachably coupled with the heat exchange chamber.

In a tenth aspect of the invention, in the glass forming apparatus according to the eighth or ninth aspects, the heat exchange fluid is a liquid.

In an eleventh aspect of the invention, in the glass forming apparatus according to the eighth or ninth aspects, the heat exchange fluid is water.

In a twelfth aspect of the invention, in the glass forming apparatus according to the eighth or ninth aspects, the heat exchange fluid is oil.

In a thirteenth aspect of the invention, in the glass forming apparatus according to the eighth or ninth aspects, the heat exchange fluid is a gas.

In a fourteenth aspect of the invention, in the glass forming apparatus according to the eighth or ninth aspects, the heat exchange fluid is air.

In a fifteenth aspect of the invention, glass is formed by the glass forming apparatus according to any one of the first to the fourteenth aspects.

In a sixteenth aspect of the invention, crystallized glass is formed by the glass forming apparatus according to any one of the first to the fourteenth aspects.

In a seventeenth aspect of the invention, in a glass forming method for manufacturing glass by pressing a glass material between dies, in an apparatus having a plurality of dies, at least one die is divided into a heat exchange unit and a press unit and coupled to pressing means, in which the dies are replaced by detaching the die divided into the heat exchange unit and the press unit, from the pressing means.

In an eighteenth aspect of the invention, in the glass forming method according to the seventeenth aspect, a contact surface between the die to be replaced and the heat exchange unit of the press unit is polished in advance.

In a nineteenth aspect of the invention, in the glass forming method according to the seventeenth or eighteenth aspects, the press surface of the press unit of the die to be replaced is polished in advance.

In a twentieth aspect of the invention, in the glass forming method according to the eighteenth or nineteenth aspects, the polishing process is executed by a rotary grinder.

In a twenty-first aspect of the invention, in the glass forming method according to any of the seventeenth to the twentieth aspects, a heat exchange fluid circulates in the heat exchange unit, and exchanges heat with the press unit.

In a twenty-second aspect of the invention, in the glass forming method according to the twenty-first aspect, the heat exchange fluid is a liquid.

In a twenty-third aspect of the invention, in the glass forming method according to the twenty-first aspects, the heat exchange fluid is water.

In a twenty-fourth aspect of the invention, in the glass forming method according to the twenty-first aspect, the heat exchange fluid is oil.

In a twenty-fifth aspect of the invention, in the glass forming method according to the twenty-first aspect, the heat exchange fluid is a gas.

In a twenty-sixth aspect of the invention, in the glass forming method according to the twenty-first aspect, the heat exchange fluid is air.

In a twenty-seventh aspect of the invention, glass is manufactured by the glass forming method according to any of the seventeenth to the twenty-sixth aspects.

In a twenty-eighth aspect of the invention, crystallized glass is manufactured by the glass forming method according to any of the seventeenth to the twenty-sixth aspects.

According to the invention, replacement of only a heavily worn press unit is possible, cost is reduced and productivity is enhanced.

Furthermore, favorable heat conduction is obtained between the press unit and the heat exchange unit, the forming condition (cooling or heating condition of glass material) is stabilized, and a glass of high quality is formed efficiently.

Heat conduction is averaged in a certain area of a contacting surface of the press unit and the heat exchange unit. As a result, partial wear of the press surface of the press unit is reduced. Breakage of the press unit is reduced.

When discarding and replacing the press unit at the end of use, the heat exchange unit and the press unit can be detached and replaced as a set. When replacing the press unit, the dividing surface of the heat exchange unit can be finished by a rotary grinder or the like, and the contact precision of the contacting surfaces of the heat exchange unit and the press unit can be maintained in an excellent state.

DETAILED DESCRIPTION OF THE INVENTION

Figure 1:
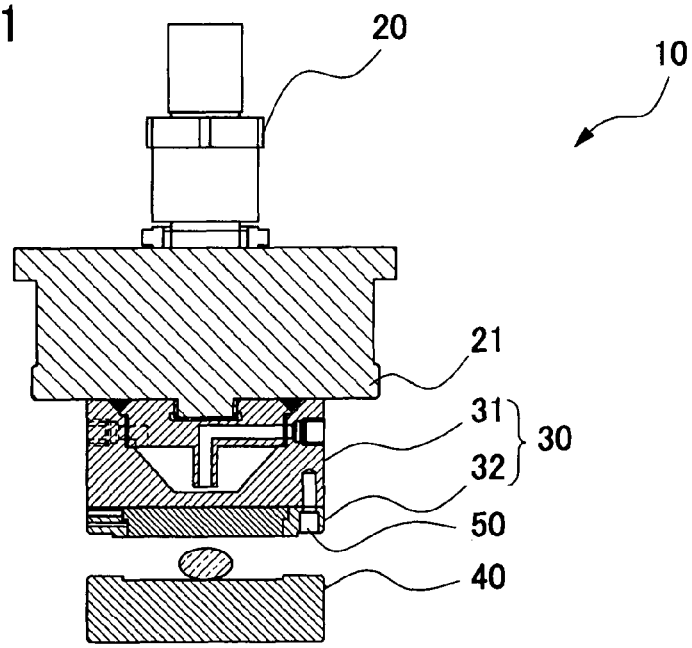
FIG. 1 is a partly cut-away front view showing a schematic of a glass forming apparatus in an embodiment of the invention.

In the glass forming apparatus of the invention, the glass forming die is composed of a plurality of dies, and at least one of the dies is divided into a heat exchange unit and a press unit. In particular, since the press unit is in contact with the glass material and forms a glass product, is heavily worn, and is required to have a high surface precision, it must be replaced often; however, it is possible to replace only the press unit at this time, and the cost can be lowered. By quick replacement, productivity can be enhanced.

At least one part of dividing surfaces in contact with the heat exchange unit and the press unit has surface precision with flatness (PV) of 500 μm or less, more preferably 70 μm or less, or most preferably 10 μm or less, and surface roughness (Ra) of 100 μm or less, more preferably 20 μm or less, or most preferably 5 μm or less.

When the surface precision of at least one part of the dividing surfaces in contact with the heat exchange unit and the press unit has a flatness (PV) of 500 μm or less, the contact precision of the contacting surfaces is excellent when the heat exchange unit and the press unit are in contact with each other. Accordingly, the heat conduction between the heat exchange unit and the press unit is averaged on the contacting surfaces, and the forming condition (cooling of heating condition) of glass material is stabilized.

For example, when cooling the press unit, hot spots may be formed on the press surface unless the press surface of the press unit is cooled partially. When hot spots are formed, the press surface is partially corroded, and the quality of a formed piece deteriorates. By the abovementioned configuration of the present invention, the difference in heat conduction between the heat exchange unit and the press unit is improved, hot spots are eliminated, and partial wearing of the press surface of press unit can be effectively prevented. Moreover, excessive force is not applied locally, and the die does not break easily. When the surface roughness (Ra) is 100 μm or less, by making contact between the heat exchange unit and the press unit, the contact precision of the contacting surfaces is superior. Hence, the heat conduction is much improved.

With regard to the surface precision of the dividing surface, when 80% or more of the projected area of the formed piece on the dividing surface is within a range of the abovementioned value, uniform and efficient heat exchange is possible, force is not applied locally when pressing, and the die is not broken easily. From this point of view, a figure of 90% or more is preferred, and most preferably the entire dividing surface should be in contact with the heat exchange unit and the press unit.

Herein, the flatness (PV) is expressed by the sum of maximum height and maximum depth from the reference plane in the measuring range. In the invention, using a probe type contour measuring instrument, two arbitrary straight lines orthogonally passing through the approximate center of the measuring surface are measured, the maximum value obtained is regarded as the flatness (PV), and the flatness (PV) is determined in the area range of a circle whose diameter is the measured straight line. The surface roughness (Ra) is the average roughness of the central line, and the measuring length is 10 mm. The "projected area of the formed piece on the dividing surface" is the relative area of the press surface of the press unit in contact with the formed piece (that is, the area projected on the dividing surface when projected on the formed piece).

When the dividing surface is flat, a rotary grinder can be used in a polishing process. As a result, a plane of the dividing surface of an extremely good surface precision can be obtained. In the invention, a dividing surface having a bolt hole is included in the concept of a "plane."

The die divided into the heat exchange unit and the press unit is preferably coupled detachably to the pressing means (or press machine) for pressing and forming by moving the die up and down by the heat exchange unit. Thus, the die can be replaced quickly by detaching the heat exchange unit and the press unit as a set. The coupling means is preferably realized by screwing because it is possible to replace quickly and couple securely. The heat exchange unit can be detached from the pressing means (press machine), and the dividing surface of the heat exchange unit (the side in contact with the press unit) can be ground, and the surface precision of the plane can be maintained in an excellent state.

In the press unit, when the forming surface is roughened, it can be replaced promptly, and the shutdown time is minimized; it is preferred to prepare in advance a press unit alone or the heat exchange unit and press unit in a set as stock for replacement. The press surface of the press unit is ground to a smooth surface by a rotary grinder or the like, and at this time by grinding both sides, the contacting surface with the heat exchange unit can be also polished similarly.

For grinding the press unit or heat exchange unit, a linear grinder or rotary grinder can be used, and it is preferred to use a rotary grinder because a higher flatness is realized than by using a lathe or the like.

The heat exchange unit may be provided, for example, with a cooling fin to exchange heat with the fresh air, but preferably a heat exchange chamber should be provided inside because the heat exchange efficiency is higher. The inside of the heat exchange chamber has a passage for circulating a heat exchange fluid for exchanging heat with the peripheral parts, and the passage is detachably coupled to an external passage such as piping or the like, and the heat exchange fluid is preferably supplied from outside for circulation. The passage can be coupled by using a metal coupler or the like.

Accordingly, for example, when pressing and forming a molten glass material placed in the center of the press surface, a cooling fluid is circulated in the heat exchange chamber, the heat conducted from the press surface of the press unit is absorbed by the dividing surface of the heat exchange unit, and the press surface is cooled. Alternatively, for example, in the glass forming apparatus for pressing and forming by softening the solidified glass material (for example, a glass gob), a high temperature fluid is circulated in the heat exchange chamber, heat is transferred to the press unit by way of the heat exchange unit, the heat is supplied to the solidified glass, and thereby the glass material is softened and formed. Since the heat exchange fluid passage is detachable from the heat exchange chamber, the heat exchange unit can be easily detached or attached.

In the invention, the press surface is the side in contact with the glass material in the die for pressing and forming the glass material, and the reverse-press side is the opposite side. In the heat exchange unit, the press side is the side in contact with the press unit (the glass material direction side) or the dividing side.

There is no particular limitation to the heat exchange fluid as long as heat can be exchanged with glass material by way of the heat exchange unit or press unit; either liquid or gas may be used, but; liquid is preferable from the viewpoint of heat conductivity, and water, oil or air may be used. In particular, water is preferred because it is safe, readily available, easy to handle, and low in cost.

An embodiment of the glass forming apparatus of the invention and the glass forming method using this glass forming apparatus is explained below. In the explanation of the embodiment, the same parts are identified with the same reference numerals, and the explanation is omitted or simplified.

Glass Manufacturing Apparatus

Figure 2:
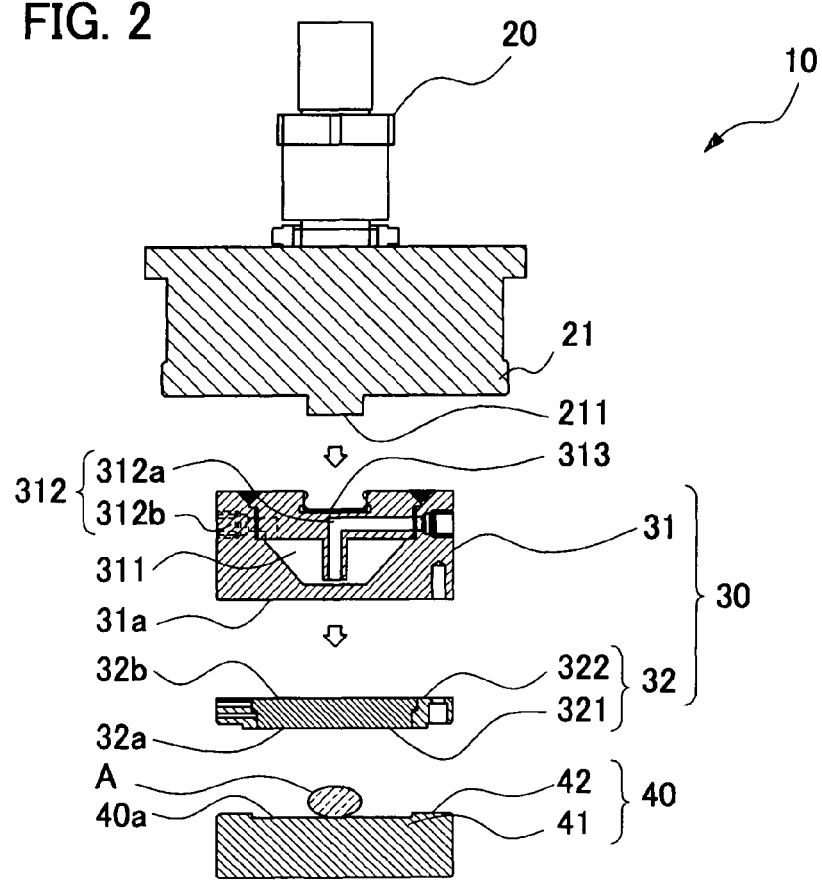
FIG. 2 is an exploded view of a schematic configuration of the glass forming apparatus in the embodiment of the invention.
Figure 3:
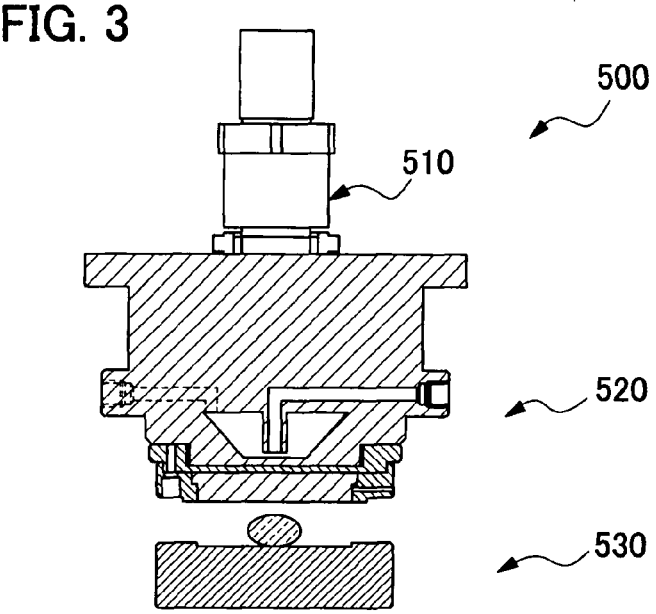
FIG. 3 is a partly cut-away front view of a schematic of an initial glass forming apparatus.
Figure 4:
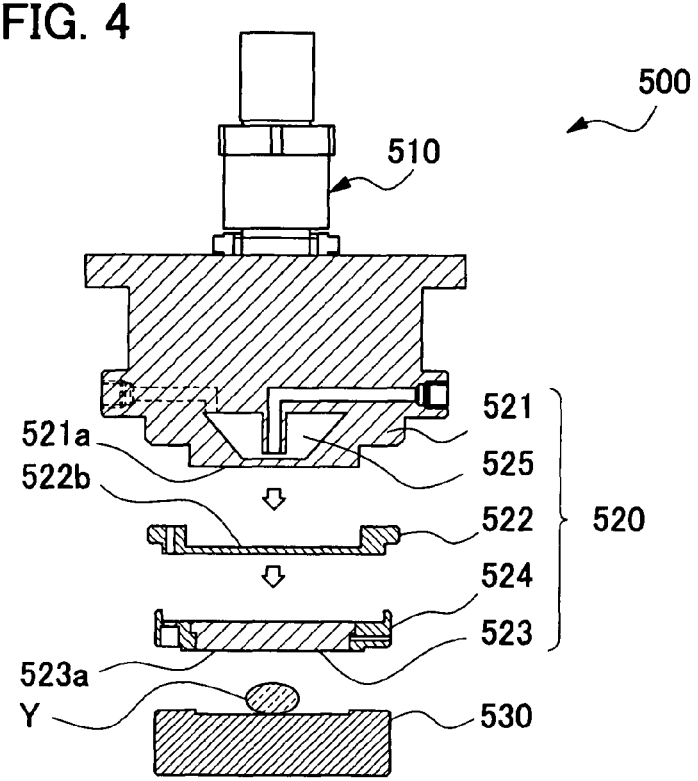
FIG. 4 is an exploded view of a schematic configuration of an initial glass forming apparatus.

FIG. 1 is a partially cut-away front view showing the outside of the glass manufacturing apparatus in an embodiment of the invention, and FIG. 2 is an exploded view of the glass manufacturing apparatus in an embodiment of the invention. The glass forming apparatus in the embodiment is only an example, and the structure of the pressing means, upper die, lower die and the like is not limited to the illustrated example.

As shown in FIG. 1 and FIG. 2, a glass forming apparatus 10 includes a pressing means (press machine) 20, a lower die 40 for mounting a glass material A, and an upper die 30 opposite to the lower die 40 for pressing the placed glass material A. The press machine 20 has, for example, a cylinder (not shown) moving up and down by hydraulic means or the like, and a die platform 21 for mounting the upper die 30 in its lower part. The die platform 21 has a convex portion 211 formed nearly in the center of the anti-pressing means side, and the side of this convex portion 211 is threaded.

The upper die 30 is composed of a heat exchange unit 31 and a press unit 32. A heat exchange chamber 311 is formed inside the heat exchange unit 31, and a passage 312 for circulating a heat exchange fluid is formed in the heat exchange chamber 311. The passage 312 is composed of a heat exchange fluid lead-in route 312a for introducing the heat exchange fluid into the heat exchange chamber 311, and a heat exchange fluid lead-out route 312b for discharging to the outside, and the heat exchange fluid lead-in route 312a and heat exchange fluid lead-out route 312b are detachably coupled to outside pipes (not shown) by means of a metal coupler or the like. When detaching the heat exchange unit 31, it is possible to separate the heat exchange fluid lead-in route 312a and heat exchange fluid lead-out route 312b from the outside pipes.

In the upper part of the heat exchange unit 31, a recess 313 is formed to engage with a convex portion 211 formed on the die platform 21. The side surface of the recess 313 is threaded, and the heat exchange unit 31 and the press machine 20 are coupled by a screw engagement between the convex portion 211 of the die platform 21 and the recess 313 of the heat exchange unit 31. The press unit 32 is composed of a press unit main body 321, and a fixing ring 322 for fixing the press unit main body 321. The inner side of the fixing ring 322 is formed in steps, and the press unit main body 321 is supported. The heat exchange unit 31 and the press unit 32 are coupled by coupling means 50 such as bolts for connecting the fixing ring 322 to the heat exchange unit 31 by contact between dividing side 31a of the heat exchange unit 31 and dividing side 32b of the press unit 32.

Although not shown in the drawing, the structure further includes a temperature sensor for measuring the temperature of the press unit 32, a pump for feeding the heat exchange fluid into the heat exchange chamber 311, and a control circuit for controlling the pump.

The dividing side 31a of the heat exchange unit 31 is a flat plane, and is finished by, for example, a rotary grinder, to a flatness (PV) of 5 μm, and a surface roughness (Ra) of 1 μm. The surface precision is sufficient when the area of each dividing surface having the specified surface precision is 80% or more of the projected area of the formed piece on the dividing surface (corresponding to the area of formed piece on the dividing surface). The entire surface of the dividing side 31a of the heat exchange unit 31 preferably conforms to the specified surface precision. Finishing of the dividing side 31a of the heat exchange unit 31 is performed as required depending on the degree of decline of surface roughness due to use, when the press unit 32 is being replaces due to being worn out through usage. As a result, a high contact precision can be maintained.

The dividing side 32b of the press unit 32 is a flat plane like the dividing side 31a of the heat exchange unit 31, and is finished to a flatness (PV) of 5 μm, and a surface roughness (Ra) of 1 μm. The flatness (PV) was measured by using Contracer CB-41 of Mitsutoyo Corporation. The surface roughness was measured by using Profiler P-12 of KLA Tencor Corporation. This surface precision, the same as for the dividing side 31a of the heat exchange unit 31, is sufficient when the area of each dividing surface having the specified surface precision is 80% or more of the projected area of the formed piece on the dividing surface. Clearly, the entire surface of the dividing side 32b of the press unit 31 may conform to the specified surface precision.

As a result, the contact precision is greatly improved when the heat exchange unit 31 and the press unit 32 are in contact with each other, the heat conduction between the heat exchange unit 31 and the press unit 32 is made uniform over the entire surface, the heat exchange condition when forming is stabilized, and the glass can be formed efficiently. Breakage of the press unit main body 321 is decreased, frequency of replacement is lowered, and the cost is reduced.

The press unit 32 is ground simultaneously in the press side 32a and the dividing side 32b in contact with the heat exchange unit 31, by a rotary grinder or the like, and is finished to a specified surface precision. When the press unit 32 and the heat exchange unit 31 are integrally assembled, a high contact precision is assured between the dividing side 32b of the press unit 32 and the dividing side 31a of the heat exchange unit 31. The surface precision of the press side of the upper die 30, that is, the press side 32a of the press unit 32 is improved, and the surface roughness of the formed glass is enhanced.

The lower die 40 is composed of a circular columnar lower die main body 41, and a protrusion 42 projecting from the upper end of the lower die main body 41. The upper surface of the lower die main body 41 is the press side 40a. A glass material A is placed in the center of the press side 40a, and the press side 40a presses the placed glass material A together with the press side 32a of the press unit 32 of the upper die 30. The upper surface of the protrusion 42 is a smooth surface. The lower die 40 has a diameter nearly the same as that of the press unit 32 of the upper die 30, and is disposed coaxially with the upper die 30. The press side 32a of the upper die 30 and the press side 40a of the lower die 40 approach each other, the press side 32a makes contact with the protrusion 42, and the clearance of the press side 32a and the press side 40a is formed to be equal to the thickness of the glass formed piece. In the embodiment, the lower die 40 is fixed, but may be moved up and down by driving means not shown.

A passage 312 for the heat exchange fluid is formed in an L-form inside the heat exchange unit 31, and is composed of a heat exchange fluid lead-in route 312a having its terminal end extended nearly to the center of the bottom of the heat exchange chamber 311, and a heat exchange fluid lead-out route 312b communicating with the ceiling of the heat exchange chamber 311. The passage 312 introduces the heat exchange fluid into the heat exchange chamber 311 from the heat exchange fluid lead-in route 312a. The heat exchange fluid in the heat exchange chamber 311 is discharged through the heat exchange fluid lead-out route 312b. The heat exchange fluid may be always supplied in the heat exchange chamber 311, but may be supplied in the heat exchange chamber 311 only when necessary, for example, when pressing and forming the glass material A.

In the embodiment, the heat exchange fluid is water. Water is used as the heat exchange fluid because it is inexpensive and easy to handle. There is no limitation to water (or water drops), and the heat exchange fluid may be also another liquid, air, or gas, such as non-oxidizing nitrogen.

Although not shown in the drawing, a pump is provided in external piping on the route of the passage 312. The pump is an example of feeding means for supplying the heat exchange fluid into the heat exchange chamber 311. That is, by the pump, the heat exchange fluid is supplied into the heat exchange chamber 311 by way of the passage 312.

A temperature sensor (not shown) is disposed near the press unit 32 of the upper die 330, and measures the temperature around the press unit 32. The temperature sensor is a detecting element using a thermocouple (not shown). The temperature sensor has two different thin metal wires connected in a closed circuit, and is designed to measure the temperature of the contact point by measuring the electromotive force generated in the circuit. The temperature sensor detects the measured electromotive force, and sends the detected signal to the control circuit. The temperature sensor is not particularly specified, as far as the temperature of the press unit 32 can be measured, and includes, for example, an instrument which measures the temperature by making use of change in the electric resistance of the metal depending on the temperature, or an instrument which measures the temperature by detecting the wavelength distribution and intensity of each wavelength of heat radiation energy. It may be installed at any position as far as the temperature of the press unit 32 can be measured.

The control circuit (not shown) is an example of feed control means, and includes CPU, ROM, RAM and others not shown in the drawing. The control circuit controls the amount of heat exchange fluid to be supplied in the heat exchange chamber 311 on the basis of the temperature of peripheral area of the press unit 32 measured by the temperature sensor. That is, on the basis of the detection signal sent from the temperature sensor, the amount of heat exchange fluid to be supplied in the heat exchange chamber 311 is controlled by controlling the pump. The amount of heat exchange fluid to be supplied in the heat exchange chamber 311 may be also controlled manually on the basis of the temperature measured by the temperature sensor.

The heat exchange fluid lead-out route 312b communicates with the heat exchange chamber 311 in the ceiling of the heat exchange chamber 311. The heat exchange fluid absorbing heat in the heat exchange chamber 311 is discharged to outside from the heat exchange chamber 311 by way of the heat exchange fluid lead-out route 312b.

In this configuration, the heat exchange fluid lead-out route 312b communicates with the ceiling in the highest position toward the anti-gravity direction of the heat exchange chamber 311, and staying of air in the heat exchange chamber 311 is prevented. Therefore, the heat exchange fluid after heat exchange is smoothly discharged to the outside, the entire press surface is kept at a temperature preferable for pressing the glass material, and a glass formed piece is obtained efficiently and at high quality.

The glass forming apparatus 10 explained so far is only an example of embodiment, and in particular the structure of pressing means (press machine) 20, and the mounting mechanism of upper die 30 and pressing means (press machine) 20 are only examples, and are not particularly specified.

Glass Forming Method

By the glass forming apparatus 10 having a configuration as described above, a method of pressing and forming a glass substrate of magnetic disk type is explained by referring to FIG. 1 and FIG. 2.

While the die is opened as shown in FIG. 1, a specified amount of molten glass A is poured into the lower die 40 from a supply pipe not shown. The supplied molten glass A is put in the center of the press side 40a of the lower die 40. By driving the pressing means (press machine) 20, the upper die 30 is moved down, and the upper die 30 is moved closer to the lower die 40. Part of the upper part of the molten glass A makes contact with the center of the press side 32a of the press unit 32 of the upper die 30, and only the upper end of the surface of molten glass A is partly pressed.

Then, the press unit 32 is moved to make contact with (touch) the protrusion 42 of the lower die 40. The molten glass A is pressed by the press unit 32 and lower die 40, spreads concentrically, and formed into a disk. Heat of the molten glass A is exchanged with cooling fluid (water) circulating in the heat exchange chamber 311 of the heat exchange unit 31 through the press unit 32. This heat exchange is realized by heat conduction between the dividing side 32b of the press unit 32 and the dividing side 31a of the heat exchange unit 31, and the heat conduction is uniform because the contact precision of the dividing sides is excellent.

The glass substrate formed in a disk shape is removed, and conveyed to a subsequent process. By repeating the same process, the disk-shaped glass products can be pressed and formed continuously. By heat treatment of the glass substrate, crystals deposit, and a disk substrate of crystallized glass is obtained.

In the embodiment, the apparatus for manufacturing a glass substrate for a magnetic disk, and the method of manufacturing a magnetic disk type glass substrate are explained, but the glass forming apparatus and glass forming method of the invention may be also applied to pressing and forming thin wall glass products other than those of a disk shape, and to thick wall glass products, specifically biconvex lens and biconcave lens. By using a glass forming apparatus of a square columnar type, that is, by forming the members of the glass forming apparatus 10 such as upper die 30 and lower die 40 in a square columnar shape, the apparatus may be used for forming square lenses.

In the embodiment, molten glass A is poured into the lower die 40 and pressed by the upper die 30, but a solidified glass material (for example, a glass gob) may be used and softened by a melting device provided in the lower die 40, and pressed by the upper die 30. That is, the invention may be applied to both a direct press method and a reheat press method.

In the case of the reheat press method, solidified glass material A is put on the press side 40a, softened in the lower die 40, and pressed and formed by the upper die 30, and in the heat exchange chamber, and high temperature fluid may circulate, as a heat exchange medium, in at least one of the upper die 30 and lower die 40.

In the embodiment, materials for the heat exchange unit 31 of upper die 30, the press unit main body 321, the fixing ring 322, and the lower die 40 may be appropriately selected from graphite, tungsten alloy, nitride, carbide, heat resistant metal, and other materials, according to the properties of the glass to be pressed, and in particular ductile materials and compound ceramics of silicon carbide-carbon are preferred. The heat exchange unit 31 of the upper die 30, the press unit main body 321, the fixing ring 322, and the lower die 40 may be heated and held at a specified temperature by electric or gas heating. Similarly, materials for the heat exchange fluid lead-in route 312a and the heat exchange fluid lead-out route 312b may be appropriately selected from heat resistant alloy, metals excellent in oxidation resistance, and other materials.

In the embodiment, only the upper die is used for heat exchange in the glass forming apparatus and glass forming method, but both upper die and lower die may be used for heat exchange in the glass forming apparatus, or only the lower die may be used for heat exchange in the glass forming apparatus. There is no limitation to the upper die and lower die; shell dies may be used, and shell dies may be used for heat exchange.

The invention is not limited to the foregoing embodiment alone, but may be changed and modified within the scope not departing from the spirit of the invention.

What is claimed is:

1. A glass forming apparatus comprising a die having a press surface for pressing a glass material, and a pressing means which drives the die and press forms the glass material,
   wherein the die has a plurality of dies, and
   at least one die is divided a cooling unit and a press unit, the cooling unit and the press unit being coupled by a coupling means, and the at least one die is detachably coupled to the pressing means at the cooling unit in a state in which the cooling unit and the press unit are integrated.

2. The glass forming apparatus of claim 1, wherein surface precision of at least one part of each dividing surface in contact with the cooling unit and the press unit has a flatness (PV) of at most 500 µm.

3. The glass forming apparatus of claim 1, wherein surface precision of at least one part of the dividing surface has a surface roughness (Ra) of at most 100 µm.

4. The glass forming apparatus of claim 2, wherein the area of each dividing surface having the surface precision is at least 80% of a projected area of a formed piece on the dividing surface.

5. The glass forming apparatus of claim 1, wherein the dividing surface divided into the cooling unit and the press unit is a surface comprising a flatness (PV) of at most 500 µm.

6. The glass forming apparatus of claim 1, wherein the die is detached from the pressing means and replaced in a state in which the cooling unit and the press unit are integrated.

7. The glass forming apparatus of claim 1, wherein a heat exchange chamber is formed inside the cooling unit, and a heat exchange fluid for exchanging heat with a peripheral area thereof circulates inside the heat exchange chamber.

8. The glass forming apparatus of claim 7, wherein a passage for circulating the heat exchange fluid is detachably coupled with the heat exchange chamber.

9. The glass forming apparatus of claim 7, wherein the heat exchange fluid is a liquid.

10. The glass forming apparatus of claim 7, wherein the heat exchange fluid is water.

11. The glass forming apparatus of claim 7, wherein the heat exchange fluid is oil.

12. The glass forming apparatus of claim 7, wherein the heat exchange fluid is a gas.

13. The glass forming apparatus of claim 7, wherein the heat exchange fluid is air.

* * * * *

UNITED STATES PATENT AND TRADEMARK OFFICE
CERTIFICATE OF CORRECTION

PATENT NO.       : 8,156,765 B2
APPLICATION NO.  : 11/783214
DATED            : April 17, 2012
INVENTOR(S)      : Moriji Nozaki Page 1 of 1

It is certified that error appears in the above-identified patent and that said Letters Patent is hereby corrected as shown below:

Claim 1, column 11, line 19, replace "...die is divided a cooling unit and a..." with --...die is divided into a cooling unit and a...--.

Signed and Sealed this
Thirty-first Day of July, 2012

David J. Kappos
*Director of the United States Patent and Trademark Office*